United States Patent [19]

Siems

[11] 3,906,487

[45] Sept. 16, 1975

[54] DIGITAL AGC FOR PLAYBACK OF DIGITALLY RECORDED DATA

[75] Inventor: Lee E. Siems, Houston, Tex.

[73] Assignee: Digital Data Systems, Inc., Houston, Tex.

[22] Filed: Aug. 13, 1974

[21] Appl. No.: 496,597

Related U.S. Application Data

[63] Continuation-in-part of Ser. No. 296,457, Oct. 10, 1972, abandoned.

[52] U.S. Cl. ............ 340/347 DA; 340/15.5 GC; 340/15.5 DP; 340/347 DD; 235/152

[51] Int. Cl.[2] ........................................ H03K 13/00

[58] Field of Search .............. 340/347 DA, 347 DD, 15.5 GC, 340/15.5 DP; 235/154, 152, 150.31, 197, 156

[56] References Cited

UNITED STATES PATENTS

| | | | |
|---|---|---|---|
| 3,458,859 | 7/1969 | Godfrey | 340/15.5 GC |
| 3,555,540 | 1/1971 | Hartke | 340/347 DA |
| 3,562,504 | 2/1971 | Harris | 340/347 DA |
| 3,685,046 | 8/1972 | Howlett | 340/347 DA |

*Primary Examiner*—Charles D. Miller

*Attorney, Agent, or Firm*—Michael P. Breston

[57] ABSTRACT

A wavetrain of electrical analog signals having a wide dynamic range is sampled and quantized at predetermined time intervals. The quantized samples are formatted as floating-point-numbers. Absolute values of the exponents of the floating point numbers are low-pass filtered over the duration of the wavetrain. For playback, the mantissas of the floating-point numbers representing quantized samples are denormalized and are multiplied by an exponential multiplier derived from the present value of the filtered absolute-valued exponents to form logarithmically compressed products. These products are preferably converted from digital to analog form for visual display.

9 Claims, 5 Drawing Figures

DIGITAL AGC FOR PLAYBACK OF DIGITALLY RECORDED DATA

RELATION TO PREVIOUS APPLICATION

This application is a continuation-in-part of my co-pending application Ser. No. 296,457, now abandoned.

BACKGROUND OF THE INVENTION

In many fields of research, as in seismic exploration, wavetrains of electrical analog signals, say 6 to 8 seconds long, are generated. The signal level between the beginning and the end of the wave train may decay in a ratio of more than a million to one.

In a typical digital recording system, the electrical analog signal levels are sampled at preselected time intervals. The samples are then quantized as representative binary numbers. The quantized samples form a discrete time series representative of the original analog wave train and are recorded on a magnetic tape in floating point format for future use.

The basic data are recorded on magnetic tape, and an instant later the same data are read back from the tape and converted to analog signals for a visual monitor-recording of the signals. The purpose of the monitor recording is to check the data-quality and proper equipment-functioning. Modern digital seismic apparatus can faithfully detect and record signals having a dynamic range of better than 120 db (1,000,000:1), but oscillographic cameras used for playing back the recorded signals as a visual display having a dynamic range which is limited to about 40dB (100:1) or less. In order to display data having such a wide dynamic range on a visual recording having restricted dynamic range, automatic gain control (AGC) is applied by means of a variable attenuator.

In the prior art, involving either digital or analog equipment, the automatic gain-control is generated by first feeding a signal to a preamplifier and thence to a variable attenuator coupled to a high-gain amplifier. The output of the high-gain amplifier is connected to a detector which senses and rectifies the amplified signals. The rectified signals are filtered with respect to time and are compared to a reference voltage or number. Depending on the results of the comparison, the gain of the variable attenuator is adjusted either up or down to maintain the output of the high-gain amplifier within a preselected amplitude range as determined by the reference signal or number. The applied gain function is the reciprocal of the average decaying signal level. In addition to the long-term, average signal-level decay, short-term, signal-level transients also occur. The responsiveness of the gain function to transients is adjusted by altering the attack rate of the AGC loop. The attack rate is the reciprocal of the time period required for the AGC to respond to an abrupt, transient, signal-level change.

In modern digital seismic recording systems, the quantized data samples are formatted into 32-bit words, and are then recorded preferably in floating-point format. It is evident that detection, filtering, rectification, comparison, and multiplication of long 32-bit binary words require complex and expensive logical hardware. There is a need therefore for a simplified and economical digital AGC method requiring relatively-inexpensive components.

A discrete time series comprising quantized samples of an analog wave train is represented by a set of floating-point numbers. I have determined that the absolute values of the exponents of the floating-point numbers are an inverse measure of the original analog signal level. The absolute values of the exponents are filtered over the time duration of the wave train. The thusly obtained function is reciprocally related to the average signal decay rate, and hence, can be used to generate a digital AGC operator. The use of the exponents for automatic gain control is particularly advantageous, since the exponents can always be expressed by elementary, four-bit, binary numbers. Exponent filtering can therefore be done by use of relatively simple, inexpensive, four-bit adders, accumulators, and counters.

SUMMARY OF THE INVENTION

The signal level of an electrical wave train is sampled periodically at a preselected sample rate. The wave train has a wide dynamic range and an unknown time-varying decay rate throughout its duration. The samples are quantized as a set of floating-point numbers to form a discrete time series representative of the original wave train. Each floating-point number consists of an algebraic sign, an exponent to a preselected number base, and a mantissa. The absolute value of the exponent defines the characteristic. The characteristics are low-pass filtered over the time duration of the original wave train to generate exponential multipliers.

In a more specific aspect of this invention, the characteristics are sub-sampled at a preselected, integral multiple of the data-sampling interval prior to filtering, thereby providing a predetermined AGC attack rate. The sub-sample rate may be adjusted automatically in accordance with the expected rate of change of signal strength. Alternatively, the sub-sample rate may be manually selectable.

In a preferred embodiment of this invention, the characteristics of the quantized data are sampled and filtered. The signs and mantissas of the quantized data samples are denormalized. At each sample time, a preselected number base is raised to the power defined by the present value of the filtered characteristics to form a series of exponential multipliers. Each member of the series of exponential multipliers is multiplied by a corresponding denormalized mantissa to form desired, logarithmically-compressed products. The products are converted to analog form for display on a visual display device.

In a further aspect of this invention, the number base used to form the exponential multiplier is less than the original number base of the floating-point numbers representing the data samples.

DETAILED DESCRIPTION OF THE INVENTION

Figures 1, 2, 3, 4, 5:
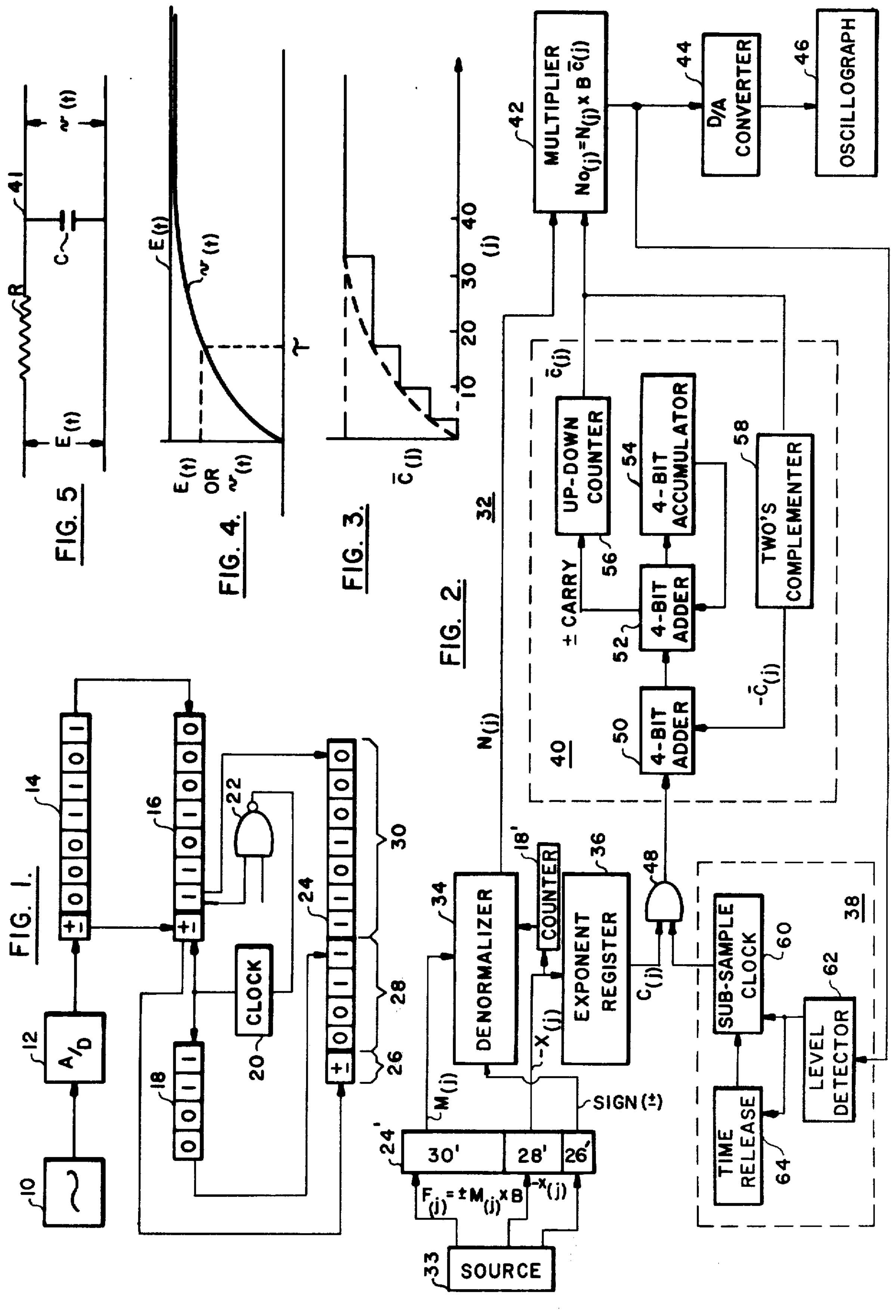
FIG. 1 is a schematic representation in accordance with this invention, of an apparatus for normalizing and denormalizing quantized data samples.
FIG. 2 is a schematic diagram of a digital AGC circuit in accordance with this invention.
FIG. 3 shows a classic R-C filter useful in explaining the mechanism of the digital filter employed in this invention.
FIG. 4 is a response curve of the low-pass RC filter shown in FIG. 3.
FIG. 5 is a response curve of the digital low-pass filter included in FIG. 2.

A set of quantized data samples form a discrete time series representative of an analog electrical wave train. The set is formatted into floating-point numbers and recorded on a magnetic tape. For the purpose of this invention, it is necessary to denormalize the mantissas of the floating point numbers and to separate the absolute values of the exponents.

In FIG. 1 is shown a portion of a seismic wave train 10 having several seconds duration. At preselected intervals, such as every 2 or 4 milliseconds, the wave train is sampled and the samples are converted in analog-to-digital converter 12 to digital numbers. Each digital number is representative of the signal level of the electrical wave train at the instant of sampling. The digital number is expressed in the binary number system and is stored in a register 14 as a pattern of binary digits or bits. Register 14 is an 8-bit register. The most significant bit position (the left-most position) is in the sign bit. A zero in this position indicates a positive number; a one in the sign-bit position indicates a negative number. The bits in the remaining seven locations represent a fraction of the full-scale value of a voltage at converter 12. For example, if a voltage of +9.99 volts at A/D converter 12 were digitally represented by a full-scale binary number consisting of a zero followed by all ones, a one-bit in the second most significant bit position followed by all zeros would represent one-half scale, of +5 volts.

In the example of FIG. 1, a binary number 00001101 is illustrated. It has a decimal value of 13 out of a possible total of 127 decimal counts which is slightly more than 1/10th-scale, or +1.097 volts.

When magnetic-tape-recorded data are to be processed by a digital computer, it is preferable that the data be expressed as a series of floating-point numbers consisting of an algebraic sign, an exponent to a preselected number base, and a mantissa or fraction. The binary number in register 14 is converted to a floating-number in a manner now to be described.

There are provided for that purpose: an 8-bit bi-directional shift-register 16, an up-down counter 18, a clock 20, and a nand-gate 22. The binary number in register 14 is transferred to shift-register 16 wherein the entire number is left-shifted, one digit per shift, until a non-zero bit is sensed in the most significant digit position by nand-gate 22. The number of shifts is counted in counter 18. After shifting, counter 18 has a number which is defined as the characteristic or the absolute value of the exponent.

In the above example, three left shifts are required. Counter 18 contains the binary number 0011 (decimal 3). Assuming base-two notation, every single-bit left-shift is a multiplication by 2. Therefore, three successive left shifts represent a multiplication by 8. The data-sign bit from register 14 is transferred directly to the most significant bit position in register 16. The contents of shift register 16 and of counter 18 are assembled as a single floating-point number in an assembly register 24. The floating-point number in register 24 may then be transferred through well-known tape-write circuitry to a magnetic tape (not shown).

In assembly register 24, the left-most bit position is the data-sign bit 26. The next four bit positions, generally grouped as 28, define the exponent field. The remaining seven bits define the mantissa field 30 of the floating point number. Mantissa field 30 contains the significant digits of the number. Exponent field 28 defines the position of the binary point and is negative in this case. In register 24 the exponent is 0011, the mantissa is 1101000, and the floating-point number can be expressed in deciaml format as $2^{-3} \times 104 = 13$ which is the decimal value corresponding to the fixed-point binary number residing in register 14.

A floating-point number can be read back from a magnetic tape into assembly register 24 and the floating point number can be reconverted to a fixed-point binary number by simply reversing the above process and shifting the mantissa in mantissa field 30 to the right until the exponent in exponent field 28 becomes zero. The process of converting a fixed-point binary number to a floating-point number is termed "normalization". The reverse process is defined as "denormalization". Thus, bi-directional shift register 16 may be used as a normalizer or as a denormalizer.

For simplicity, only 8-bit registers and a 4-bit counter have been shown in FIG. 1, but 32-bit registers are frequently used in practice. Furthermore, the exponents may be expressed to base 8 (octal) or base 16 (hexadecimal), instead of to base 2.

The absolute values of the exponents vary inversely with the level of the original analog signal. For example, if the binary number 1000000 (representing a half-scale signal) were in register 14, upon conversion to floating-point, the exponent would have been 0000 because no left shift was needed. On the other hand, had the binary number been 0000001 (representing a signal level of 1/128 of full scale) the corresponding floating-point exponent would have been 0110 (decimal 6) because six left-shifts were required for normalization.

The characteristics may be low-pass filtered over the duration of the wave train. The output of the filter as a function of time is reciprocal to the average decaying signal-level and may be used as an AGC operator in the digital AGC system 32 of this invention.

Digital AGC system 32 (FIG. 2) includes a source of floating point numbers 33, an assembly register 24', denormalizer 34, exponent register 36, counter 18', subsample clock control 38, low-pass filter 40, multiplier 42, digital-to-analog converter 44, and a display device 46.

A stream of floating-point numbers $F_{(j)}$, representing quantized data samples, enters assembly register 24' from a source 33. Assembly register 24' is equivalent to register 24 of FIG. 1. Source 33 may be a magnetic tape from which the $F_{(j)}$ have been read out, after having been recorded by well-known read-after-write heads (not shown). The running index (j) is the sequence number of each sample. Since the sample rate is known, a set of (j) values constitutes a discrete function of time.

Each floating point number can be expressed mathematically as $F_{(j)} = (\pm)\ M_{(j)} \times B^{-x}(j)$, where $M_{(j)}$ is a mantissa, B is a number base, and $x_{(j)}$ is an exponent which is negative. Each floating point number is loaded into register 24' with the sign in sign-bit position 26', the exponent $x_{(j)}$ in exponent field 28', and the mantissa $M_{(j)}$ in mantissa field 30'. After each $F_{(j)}$ is assembled in register 24' the mantissa field 30' and sign bit 26' are transferred in parallel to denormalizer 34, and the exponent field 28' is transferred in parallel to exponent register 36 and counter 18'.

Under control of counter 18', signed mantissa $M_{(j)}$ is denormalized in denormalizer 34 to a corresponding signed denormalized mantissa $N_{(j)}$ which is transferred to multiplier 42. The denormalizing process, employing the functions of denormalizer 34 and counter 18', is the reverse of the normalizing process described in connection with FIG. 1, employing the functions of shift register 16 and counter 18.

The exponent $x_{(j)}$ from each floating-point number $F_{(j)}$ is stored in exponent register 36, but is clocked out as the absolute value of the exponent, that is, the characteristic $c_{(j)} = |x_{(j)}|$. The characteristics $c_{(j)}$ are entered into a first 4-bit adder 50 through a gate 48 which is controlled by sub-sample clock 38. Clock 38 permits sub-sampling of the characteristics $c_{(j)}$ at integral multiples $n$ of the original data-sampling interval $_{(j)}$, such as by sub-sampling every data-sample, or every fourth data sample, or every eighth data sample. The sub-sample rate $n$ defines the attack rate of the AGC function. The attack rate is inversely proportional to the value of $n$; for example, a fast attack rate results when $n$=1, and a slow attack rate when $n$=8.

The sub-sampled characteristics $c_{(j)}$ are filtered in low-pass filter 40 in a manner to be described subsequently. For simplicity, it will be assumed that $n$=1. At any instant of time, the output of filter 40 is an output quantum $\bar{c}_{(j)}$, the present value of the filtered characteristics corresponding to one of the data samples. At each sample time $j$, a preselected number base B is raised to the power of the output quantum $\bar{c}_{(j)}$ appearing at the output of filter 40 thereby forming an exponential multiplier $B^{\bar{c}_{(j)}}$, that corresponds with the Jth data sample. Each denormalized mantissa $N_{(j)}$ is multiplied by the corresponding exponential multiplier $B^{\bar{c}_{(j)}}$ in multiplier 42. The series of the thusly-formed logarithmically compressed products $N_{o(j)}$ is transferred to digital-to-analog converter 44 for conversion to an analog signal suitable for use by a display device 46, such as a recording oscillograph.

Multiplier 42 may be a shift register which performs the function of multiplication by shifting the contents $\bar{c}_{(j)}$ digits to the left, it being understood that left shifting by one digit is equivalent to multiplication by B.

In the practice of this invention, the preferred filter is a digital differential analyzer (DDA) 40 (FIG. 2). The advantage of using a DDA in this invention is that the characteristics can be filtered by means of particularly simple, elementary, inexpensive 4-bit adders, accumulators, and counters.

A DDA computes successive values of a function by means of successive differential additions. The fundamentals of the DDA are well-known and are discussed, for example, on Page 256, "Digital Computer and Control Engineering" by R. S. Ledley, published by McGraw-Hill Book Company.

In this invention, the DDA lowpass-filters the sub-sampled characteristics stepwise, as shown in FIG. 2. Its treatment of quantized, sampled data is analogous to that of a classic low-pass RC filter 41 (FIG. 5) used for filtering continuous analog signals.

The filter's response is shown in FIG. 4. As is well-known, the curve $v(t)$ in FIG. 4 is proportional to the integral of a step-input E(t). Also, the rate of change of the step function response is directly proportional to the difference between the instantaneous values of the input and output functions of filter 41 according to $$D(t) = E(t) - v(t) = \tau\, dv/dt \qquad (1)$$

The operation of DDA 40 will now be briefly described. The forward portion of the DDA 40 consists of a second 4-bit adder 52, 4-bit accumulator 54, and up-down counter 56 which may also have a 4-bit capacity. The input data are $c_{(j)}$ which enter second adder 52. Accumulator 54 contains the running sum of the input values until a carry occurs when counter 56 is incremented or decremented by one digit. The output of accumulator 54 is $c_{1(j)}$ which is fed back into second adder 52. The rate of growth of $\bar{c}_{(j)}$ is a function of the number of carries to counter 56, it follows that with fewer bits, there will be more carries for a given number of input data.

The feedback loop from the output of counter 56 to the input of first adder 50 causes the input $Y_{(j)}$ to second adder 52 to now become $$Y_{(j)} = c_{(j)} - \bar{c}_{(j-1)} \qquad (2)$$

The step of subtraction in equation (2) is performed by a 2's complementer 58.

In equation (2), $Y_{(j)}$ represents the rate at which $c_{1(j)}$ increases and the bit-capacity of second adder 52 controls the factor of proportionality between the rates at which $c_{1(j)}$ and $\bar{c}_{(j)}$ accumulate. Therefore, $Y_{(j)}$ which is the difference between the amplitude of the step input $c_{(j)}$ and the most recent value of the response $\bar{c}_{(j-1)}$, is proportional to the rate of change of $\bar{c}_{(j)}$. Thus, equation (2) describes the function of the DDA.

The DDA's response is illustrated in FIG. 3 and is the digital equivalent of equation (1) which describes the response of low-pass R-C filter 41. FIG. 3 is therefore a graph of the growth of $\bar{c}_{(j)}$ with respect to sample-time increments (j). The rate of growth $\bar{c}_{(j)}$ is reciprocal to the average signal decay rate.

In a typical seismic data recording system, there may be a "dead" period of up to 0.5 second between the time of equipment activation and the time of arrival of the first data signals. During this "dead" period the signal levels being recorded at the system input have a very low amplitude close to or equal to zero and therefore have large characteristics, i.e., large absolute valued exponents. If the characteristics for every sample were admitted to filter 40, $\bar{c}_{(j)}$ would rapidly grow to a large value. The first-arriving data signals have a very high level. If, during the dead period, $B^{\bar{c}_{(j)}}$ had built up to a large value and if it were multiplied by the large amplitudes of the first-arriving data samples, then the very large products would overdrive the D/A converter 44. Accordingly, exponent subsample clock 60 is preset to subsample the characteristics $c_{(j)}$ at a slow rate during the dead period, such as every eighth sample.

A level detector 62 is interconnected with the output of multiplier 42. When a first non-zero data-value leaves multiplier 42, it is detected by level detector 62. Level detector 62 then forces exponent select-rate clock to fast rate such that it samples the $c_{(j)}$ for every data sample, to permit rapid AGC control of the first arrivals.

The first-arriving signals of a seismic wave train typically have a very high initial level which rapidly decays within the first 0.1 to 0.2 second at an unpredictable rate. For the remaining four or five-second duration of the wave train, the signal level decays at an expected medium rate. A time-release 64 circuit is provided. After a preselected time interval following detection of the first-arriving signals, exponent subsample clock 60 is commanded to sub-sample the characteristics $c_{(j)}$ at a medium rate, such as every second sample or every fourth sample.

In summary, during the "dead" period, a slow sub-sample rate is selected to prevent an excessively rapid growth of $c_{(j)}$. At the instant of arrival of the first seismic signal, a fast subsample rate is provided to maintain the first high-level signals within desired limits. After elapse of a preselected time interval following arrival of the first data signals, a medium sub-sample rate is selected.

Each 1-digit change in $\bar{c}_{(j)}$ alters the value of $N_{o(j)}$ by $B^{\bar{c}_{(j)}}$. If $B=2$, each 1-digit increase represents a 2:1 change in $N_{o(j)}$. In commercial practice the floating point exponents of the original data samples are determined with respect to a base $B=16$. If $B=16$, the value of $N_{o(j)}$ increases by 16:1 at each step. As was discussed earlier, each $N_{o(j)}$ is converted to analog form in D/A converter 44 for display as a continuous trace by oscillograph 46. A large abrupt change, such as 16:1 in the value of $N_{o(j)}$ would appear as an undesired discontinuity on the oscillograph trace. In one preferred embodiment of this invention, a new number base $b$ is selected to provide a new multiplier $b^{\bar{c}_{(j)}}$ wherein $b<B$, B being the original number base. Thus, if the original number base is $B=16$, a new number base $b=2$ may be selected for the exponential multipliers, such that the values of $N_{o(j)}$ change in a preferred ratio of 2:1 instead of an undesired ratio of 16:1.

A change in the number base is equivalent to taking a root of the envelope of the underlying data. For example, interpreting a number as being an exponent or characteristic to the base 2, when that number was in fact an exponent to the base 16, is equivalent to taking the fourth root of the underlying numerical value, excluding the mantissa. The dynamic range of such data may thus be decreased (i.e. AVC'd) to the extend that taking the root of the range reduces the range. For example, going from base 16 to base 2 is equivalent to dividing the range of dB by 4 or in the case of 120 dB data, reducing that range to 30 dB.

For simplicity this invention has been described in terms of a single channel. It is evident that for use in multichannel systems, the data from each channel can be multiplexed through AGC circuits 32 for individual processing.

It will be appreciated that in the above description certain networks and components are commercially available or are known and in and by themselves form no part of this invention, except in combination with other such networks and components.

What I claim is:

1. A digital AGC system for displaying electrical signals from a signal source, said signals having a wide dynamic range and a time-varying decay rate, consecutive samples of said signals being digitally represented by a series of consecutive floating-point numbers, each floating-point number consisting of an algebraic sign, a mantissa and an exponent to a base, the system including:

means to receive and to low-pass filter the absolute values of the exponents of selected ones of said consecutive floating point numbers thereby to generate from the filtered exponents corresponding exponential multipliers determined with respect to a preselected base;

means to receive and to denormalize the signed mantissas of said consecutive floating point numbers; and means to multiply the signed denormalized mantissas by the exponential multipliers corresponding to said consecutive floating-point numbers.

2. A digital AGC system for displaying electrical signals from a signal source, said signals having a wide dynamic range and a time-varying decay rate, consecutive samples of said electrical signals being digitally represented by a series of consecutive floating-point numbers, each floating point number consisting of an algebraic sign, a mantissa, and an exponent to a base, the system including:

low-pass filter means having an input and an output, the filter receiving the absolute values of the exponents of selected ones of said consecutive floating-point numbers and the filter providing to its output filtered values of the respective exponents, said filtered values defining exponential multipliers determined with respect to a preselected base;

denormalizer means having an input and an output, said denormalizer receiving at its input the signed mantissas of said consecutive floating-point numbers and providing to its output denormalized signed mantissas; and multiplier means to multiply the outputs of said denormalizer by the corresponding outputs of said low-pass filter to thereby form logarithmically compressed digital products.

3. A digital AGC apparatus for displaying electrical output signals from a signal source, said signals having a wide dynamic range and a time-varying decay rate, consecutive samples of said signals being quantized as a series of corresponding floating-point numbers consisting of an algebraic sign, an exponent to a base, and a mantissa, the apparatus including:

an assembly register having a sign bit position, an exponent field, and a mantissa field, said register being interconnected with said signal source, to receive consecutive floating point signal samples;

a denormalizer means having a shift-control input and an output, the denormalizer being interconnected with the sign bit position and the mantissa field of said assembly register;

a counter interconnected with the exponent field of said assembly register and with the shift control input of said denormalizer means;

an exponent register having an output, the register being interconnected with the exponent field of said assembly register, and said exponent register being adapted to receive the absolute values of the exponents of said consecutive signal samples;

low-pass filter means having an input and an output;

a gating means interconnected with the output of said exponent register and the input of said low-pass filter;

sub-sample clock means connected with said gating means to clock the absolute values of selected ones of said consecutive exponents from the exponent register to the input of said low-pass filter to generate at the output of said filter consecutive quanta defining exponential multipliers corresponding to the consecutive signal samples, said exponential multipliers being determined with respect to a preselected base; and a multiplier means having first and second inputs and an output, the first input being connected to the output of said denormalizer means, the second input being connected to the output of said low-pass filter, said multiplier being adapted to multiply consecutive denormalized mantissas by the corresponding exponential multipliers to thereby form logarithmically compressed digital products.

4. The apparatus of claim 3, wherein said low-pass filter is a digital differential analyzer.

5. The apparatus of claim 4, wherein said subsample clock means has fast, medium and slow subsample clock rates.

6. The apparatus of claim 5, wherein, the preselected number-base is the same as the number-base of the floating-point numbers.

7. The apparatus of claim 5 wherein, the preselected number-base is less than the number-base of the floating point numbers.

8. The apparatus of claim 7, and further including;

time-release means connected to said sub-sample clock means, and level detector means interconnected between the output of said multiplier means and with said sub-sample clock means to automatically adjust the sub-sample clock rate in accordance with the rate of change of the decay of the electrical signal.

9. The apparatus of claim 8, and further including:

digital-to-analog converter means connected to the output of said multiplier means to convert said digital products to an analog signal; and display means for displaying said analog signal.

* * * * *